United States Patent
Crosatti et al.

(10) Patent No.: US 12,471,245 B2
(45) Date of Patent: Nov. 11, 2025

(54) COLD PLATE

(71) Applicant: Rivian IP Holdings, LLC, Irvine, CA (US)

(72) Inventors: Lorenzo Marvin Crosatti, Aliso Viejo, CA (US); Diana Eaton, Newport Beach, CA (US); Najmeh Rahimi, Huntington Beach, CA (US); Andrew Richard Campbell, Laguna Niguel, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/460,507

(22) Filed: Sep. 1, 2023

(65) Prior Publication Data

US 2025/0008687 A1    Jan. 2, 2025

Related U.S. Application Data

(60) Provisional application No. 63/511,609, filed on Jun. 30, 2023.

(51) Int. Cl.
*H05K 7/20* (2006.01)
*B60L 58/26* (2019.01)

(52) U.S. Cl.
CPC .......... *H05K 7/20254* (2013.01); *B60L 58/26* (2019.02)

(58) Field of Classification Search
None
See application file for complete search history.

(56) References Cited

U.S. PATENT DOCUMENTS

| | | | |
|---|---|---|---|
| 5,495,889 A * | 3/1996 | Dubelloy | H01L 25/117 361/689 |
| 5,977,859 A | 11/1999 | Kawamura | |
| 8,580,428 B2 | 11/2013 | Kiyama | |
| 8,897,010 B2 * | 11/2014 | Shepard | H01L 23/473 174/15.1 |
| 8,991,478 B2 * | 3/2015 | Zaffetti | H05K 7/20254 165/170 |
| 8,999,548 B2 | 4/2015 | Sun et al. | |
| 9,147,875 B1 | 9/2015 | Coakley | |
| 9,545,010 B2 | 1/2017 | Coackley et al. | |
| 9,568,257 B2 * | 2/2017 | Moruzzi | F28F 1/36 |
| 9,844,148 B2 | 12/2017 | Coakley | |
| 10,180,289 B2 * | 1/2019 | Vanderwees | F28F 9/26 |
| 10,211,443 B2 | 2/2019 | Coackley et al. | |
| 10,297,813 B2 | 5/2019 | Takano | |
| 10,714,730 B2 | 7/2020 | Tyler et al. | |
| 10,964,931 B2 | 3/2021 | Coackley et al. | |

(Continued)

FOREIGN PATENT DOCUMENTS

| | | |
|---|---|---|
| FR | 2705085 | 11/1994 |
| WO | WO 2018/174621 | 9/2018 |
| WO | WO 2019/054765 | 9/2019 |

*Primary Examiner* — Courtney L Smith
(74) *Attorney, Agent, or Firm* — BAKERHOSTETLER

(57) ABSTRACT

Aspects of the subject disclosure relate to various features of a cold plate for a battery module. The battery module may be implemented in an electric vehicle or in a building. The cold plate may include a middle plate that includes one or more openings at or near an fluid inlet, the openings configured to allow a cooling fluid to be introduced into the cold plate on a first side of the middle plate, and to concurrently flow on both sides of the middle plate.

20 Claims, 16 Drawing Sheets

(56) References Cited

U.S. PATENT DOCUMENTS

| | | |
|---|---|---|
| 11,116,070 B2 | 9/2021 | Coakley |
| 11,133,538 B2 | 9/2021 | Ge et al. |
| 11,134,590 B2* | 9/2021 | Wang .................. H05K 7/20927 |
| 11,201,364 B2 | 12/2021 | Kawakami |
| 11,302,997 B2 | 4/2022 | Wynn et al. |
| 11,894,580 B2 | 2/2024 | Coakley |
| 11,979,976 B2 | 5/2024 | Coakley |
| 12,035,459 B2 | 7/2024 | Coakley |
| 12,040,511 B2 | 7/2024 | Coakley |
| 2011/0008654 A1 | 1/2011 | Kim |
| 2011/0027644 A1 | 2/2011 | Kiyama |
| 2011/0095859 A1 | 4/2011 | Shibata |
| 2012/0003508 A1 | 1/2012 | Narbonne |
| 2012/0107663 A1 | 5/2012 | Burgers |
| 2013/0071720 A1* | 3/2013 | Zahn .................... H01M 50/211 29/890.039 |
| 2013/0244077 A1* | 9/2013 | Palanchon ............ H01M 10/61 429/120 |
| 2013/0337291 A1 | 12/2013 | Mayer |
| 2015/0364744 A1 | 12/2015 | Takano |
| 2016/0025428 A1* | 1/2016 | Hendrix .................... F28F 3/12 165/166 |
| 2016/0204486 A1 | 7/2016 | Kenney |
| 2016/0315304 A1 | 10/2016 | Biskup |
| 2016/0315365 A1* | 10/2016 | Vanderwees ...... H01M 10/6557 |
| 2017/0244143 A1 | 8/2017 | Burgers |
| 2017/0256826 A1 | 9/2017 | Hong |
| 2018/0205125 A1 | 7/2018 | Bergers |
| 2018/0252479 A1 | 9/2018 | Kenney |
| 2018/0294449 A1 | 10/2018 | Zeng |
| 2018/0337434 A1* | 11/2018 | Burgers .................... F28F 9/02 |
| 2018/0375077 A1 | 12/2018 | Shin |
| 2019/0109357 A1 | 4/2019 | Kenney |
| 2019/0366876 A1 | 12/2019 | Cheadle |
| 2020/0067056 A1 | 2/2020 | Wynn et al. |
| 2020/0076022 A1 | 3/2020 | Kawakami |
| 2020/0136205 A1 | 4/2020 | Graves |
| 2020/0185686 A1 | 6/2020 | Ng |
| 2020/0203941 A1 | 6/2020 | Ing |
| 2020/0243934 A1 | 7/2020 | Galvis |
| 2021/0175588 A1 | 6/2021 | Coackley et al. |
| 2021/0226260 A1 | 7/2021 | Moon |
| 2021/0242516 A1 | 8/2021 | Rahim |
| 2021/0247145 A1 | 8/2021 | Vakilimoghaddam |
| 2021/0254895 A1 | 8/2021 | Vakilimoghaddam |
| 2022/0021048 A1* | 1/2022 | Boddakayala ...... H01M 10/625 |
| 2022/0120518 A1 | 4/2022 | Vanderwees |
| 2022/0123442 A1 | 4/2022 | Zu |
| 2022/0131212 A1* | 4/2022 | Collins ............. H01M 10/6557 |
| 2022/0190445 A1 | 6/2022 | Wynn et al. |
| 2022/0311103 A1 | 9/2022 | Findlay et al. |
| 2022/0336883 A1 | 10/2022 | Galvis |
| 2023/0111495 A1 | 4/2023 | Jung |
| 2023/0216147 A1 | 7/2023 | Yoon |
| 2023/0335853 A1 | 10/2023 | Davis |
| 2023/0378561 A1 | 11/2023 | Totman |

* cited by examiner

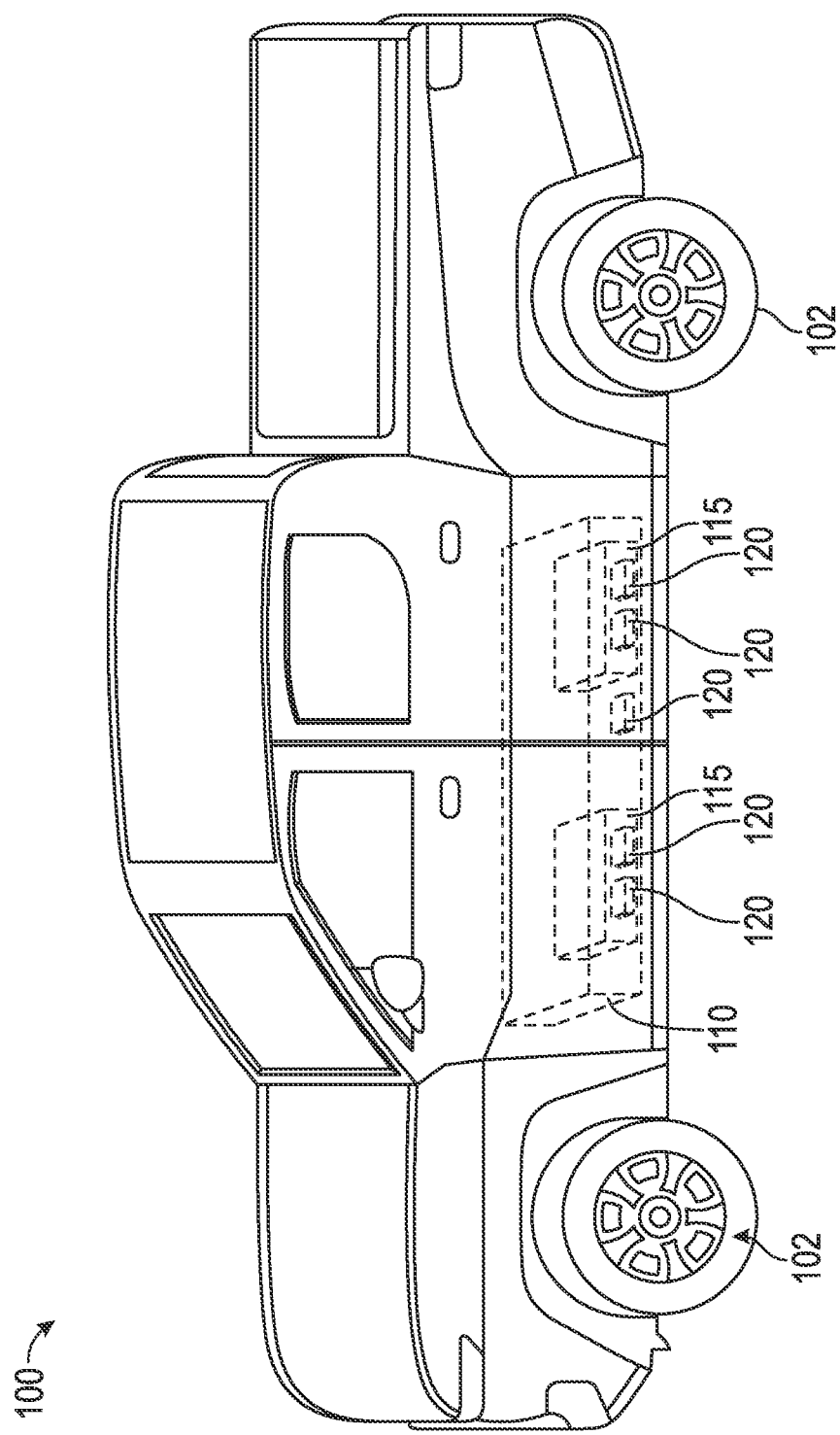

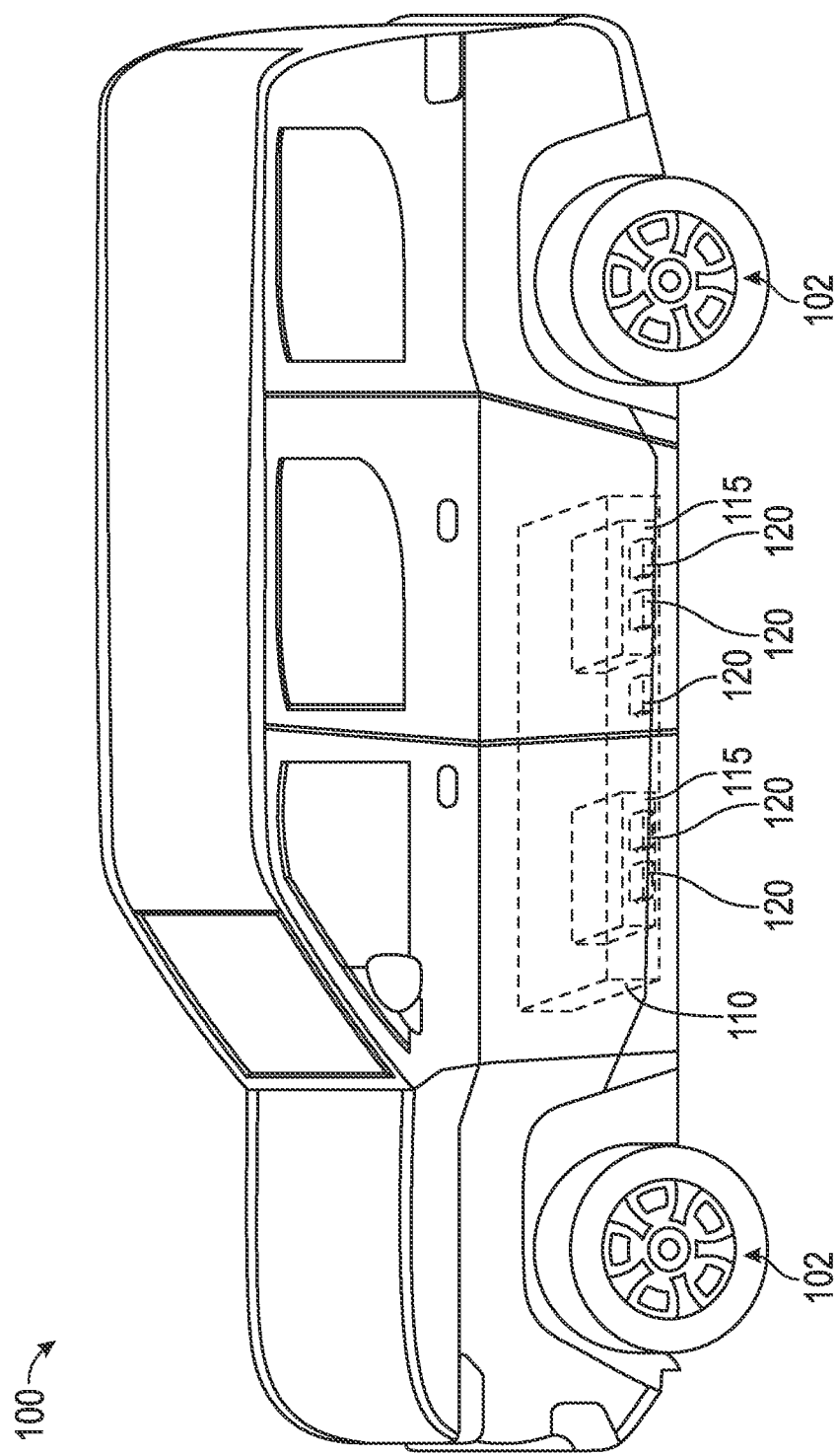

COLD PLATE

CROSS REFERENCE TO RELATED APPLICATIONS

This application claims the benefit of priority to U.S. Provisional Patent Application No. 63/511,609, entitled, "Battery Subassembly", filed on Jun. 30, 2023, the disclosure of which is hereby incorporated herein in its entirety.

INTRODUCTION

Thermally conductive structures can be used to thermally couple a cooling source to a component or other object, such as a battery cell, for which cooling is desired.

Aspects of the subject technology can help to improve the efficiency and/or range of electric vehicles, which can help to mitigate climate change by reducing greenhouse gas emissions.

SUMMARY

The present disclosure generally relates to various aspects of a cold plate, such as a cold plate for a battery subassembly. For example, aspects of the subject disclosure include features of cold plate thermal, alignment, and/or structural features.

In accordance with aspects of the subject technology, an apparatus is provided that includes a plate that includes a serpentine flow path for a thermal fluid from an inlet port to an outlet port. The plate may include a plurality of structural features that extend across the serpentine flow path.

The plurality of structural features may increase a burst pressure threshold of a cold plate. The plurality of structural features may separate a plurality of sub-channels of the serpentine flow path. The sub-channels may be partially defined by the plurality of structural features and may define the serpentine flow path on a first side of the plate.

The plurality of structural features may each extend from a floor of a corresponding sub-channel to a respective ridge. Each ridge may form an additional sub-channel of an additional serpentine flow path on an opposing second side of the plate. The plate may also include a plurality of openings that allow the thermal fluid to flow through the plate between the serpentine flow path on the first side of the plate and the additional serpentine flow path on the opposing second side of the plate.

A first set of the plurality of openings may be arranged in a first row that extends from a first corner of the plate diagonally away from first and second edges of the plate that define the first corner. A second set of the plurality of openings may be arranged in a second row that extends, from a second corner of the plate toward an inner end of the first row and diagonally away from the second edge and a third edge of the plate that define the second corner. A third set of the plurality of openings may be arranged in a third row that extends from a third corner of the plate diagonally away from the third edge and a fourth edge of the plate that define the third corner. A fourth set of the plurality of openings may be arranged in a fourth row that extends from a location along the fourth edge of the plate toward an inner end of the third row. The plurality of openings may be located at one or more corners in the serpentine flow path.

The plate may include a middle plate of a cold plate that is formed from a top plate, a bottom plate, and the middle plate disposed between the top plate and the bottom plate. The cold plate further may also include a flange that extends along an edge of the cold plate outside of the serpentine flow path, and the flange may include one or more locating features for attaching the cold plate to one or more cell carriers. The flange may also include one or more datuming features configured to facilitate alignment of a battery module with one or more structure of a battery pack. The apparatus may also include a plurality of battery cells, each disposed within an outer boundary of a thermal contact surface of the cold plate. The cold plate may be disposed between two groups of battery cells in an electric vehicle.

The plurality of structural features may include structural features formed in segments, including first segments that extend from the inlet port to a first central portion of the plate, and second segments that extend perpendicularly to the first segments from the first central portion to a second central portion of the plate. The structural features formed in segments may also include third segments that extend perpendicularly to the first segments and parallel to the first segments from the second central portion to a first edge portion of the plate, and fourth segments that extend perpendicularly to the third segments from the first edge portion to a first corner of the plate. The structural features formed in segments may also include fifth segments that extend perpendicularly to the fourth segments and parallel to the third segments from the first corner of the plate to a second corner of the plate, sixth segments that extend perpendicularly to the fifth segments from the second corner to a third corner of the plate, and seventh segments that extend perpendicularly to the sixth segments from the third corner of the plate to the outlet portion.

In accordance with aspects of the subject technology, a thermal component is provided that includes a middle plate that defines a serpentine flow path for a cooling fluid from an inlet port to an outlet port. The middle plate may include a plurality of structural features that extend across the serpentine flow path.

In accordance with aspects of the subject technology, a method is provided that includes: providing a fluid into a cold plate on a first side of a middle plate of the cold plate; and facilitating a concurrent initiation of flow of the fluid through a first serpentine flow path on a first side of the middle plate and a second serpentine flow path on an opposing second side of the middle plate. Facilitating the concurrent initiation of the flow may include allowing the fluid to flow from the first side of the middle plate to the opposing second side of the middle plate through one or more openings in the middle plate that are located at or near an inlet port of the cold plate. The method may also include allowing the fluid to flow from the first side of the middle plate to the opposing second side of the middle plate or to from the opposing second side of the middle plate to the first side of the middle plate through one or more additional openings in the middle plate that are located at a turn in the first serpentine flow path.

BRIEF DESCRIPTION OF THE DRAWINGS

Certain features of the subject technology are set forth in the appended claims. However, for purpose of explanation, several embodiments of the subject technology are set forth in the following figures.

FIGS. 1A and 1B illustrate schematic perspective side views of example implementations of a vehicle having a battery pack in accordance with one or more implementations.

DETAILED DESCRIPTION

Figure 1C:
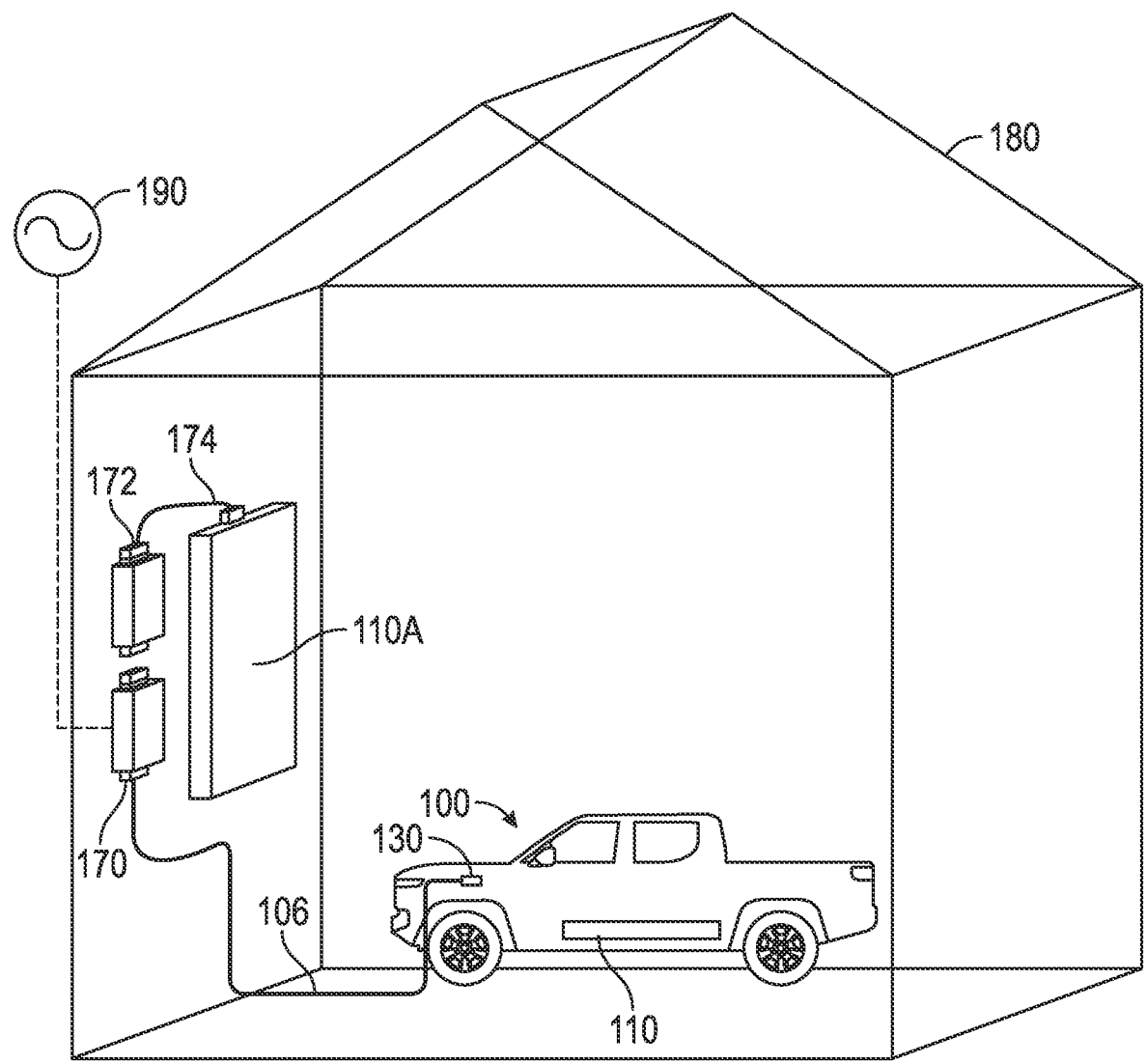
FIG. 1C illustrates a schematic perspective view of a building having a battery pack in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology described herein relate to a cold plate, such as a cold plate for a battery subassembly (e.g., a battery module). Further details of various aspects of a cold plate are described hereinafter.

FIG. 1A is a diagram illustrating an example implementation of an apparatus, such as a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid).

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

For example, the battery cell 120 can be included a battery, a battery subassembly, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
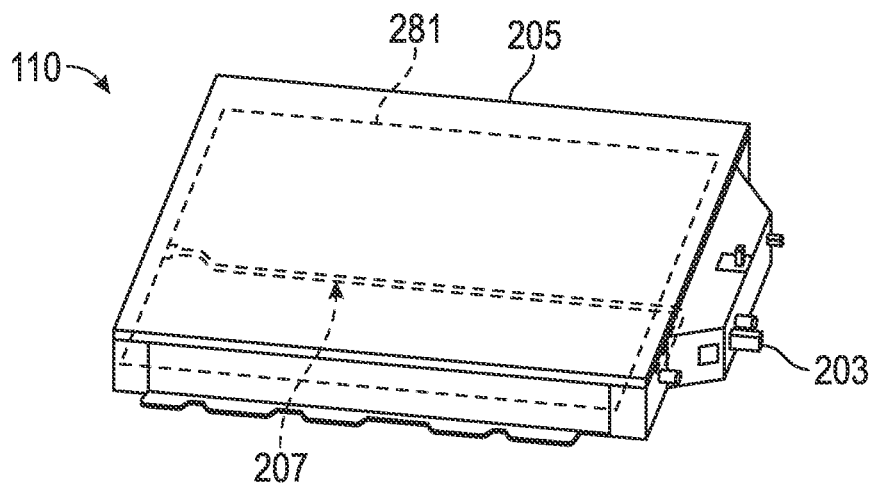
FIG. 2A illustrates a schematic perspective view of a battery pack in accordance with one or more implementations.

FIG. 2A depicts an example battery pack 110. Battery pack 110 may include multiple battery cells 120 (e.g., directly installed within the battery pack 110, or within batteries, battery units, and/or battery modules 115 as described herein) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within the battery pack frame 205 to generate a desired output voltage for the battery pack 110. The battery pack 110 may also include one or more external connection ports, such as an electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180.

As shown, the battery pack 110 may include a battery pack frame 205 (e.g., a battery pack housing or pack frame). For example, the battery pack frame 205 may house or enclose one or more battery modules 115 and/or one or more battery cells 120, and/or other battery pack components. In one or more implementations, the battery pack frame 205 may include or form a shielding structure on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules 115, battery units, batteries, and/or battery cells 120 within the battery pack frame 205, such as by distributing fluid through the battery pack 110.

For example, the thermal control structures 207 may form a part of a thermal/temperature control or heat exchange system that includes one or more thermal components 281 such as plates (e.g., cold plates) or bladders that are disposed in thermal contact with one or more battery modules 115, battery cells 120, and/or other battery subassemblies disposed within the battery pack frame 205. For example, thermal component 281 may include one or more cold plates positioned in contact with one or more battery modules 115, battery units, battery subassemblies, batteries, and/or battery cells 120 within the battery pack frame 205. In one or more implementations, the battery pack 110 may include one or multiple thermal control structures 207 and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
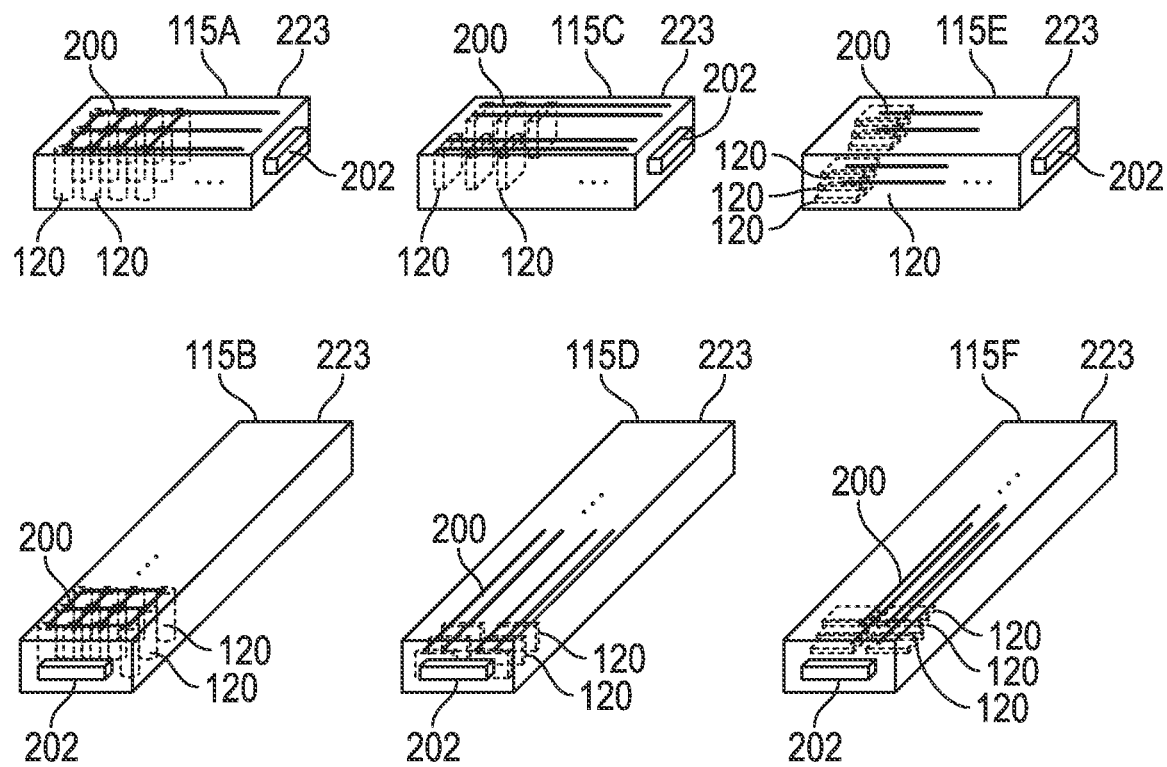
FIG. 2B illustrates schematic perspective views of various battery modules that may be included in a battery pack in accordance with one or more implementations.

FIG. 2B depicts various examples of battery modules 115 that may be disposed in the battery pack 110 (e.g., within the battery pack frame 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the battery pack frame 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the battery pack frame 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the battery pack frame 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the battery pack frame 205) may include or define a plurality of structures for positioning of the battery cells 120 directly within the battery pack frame 205.

Figure 2C:
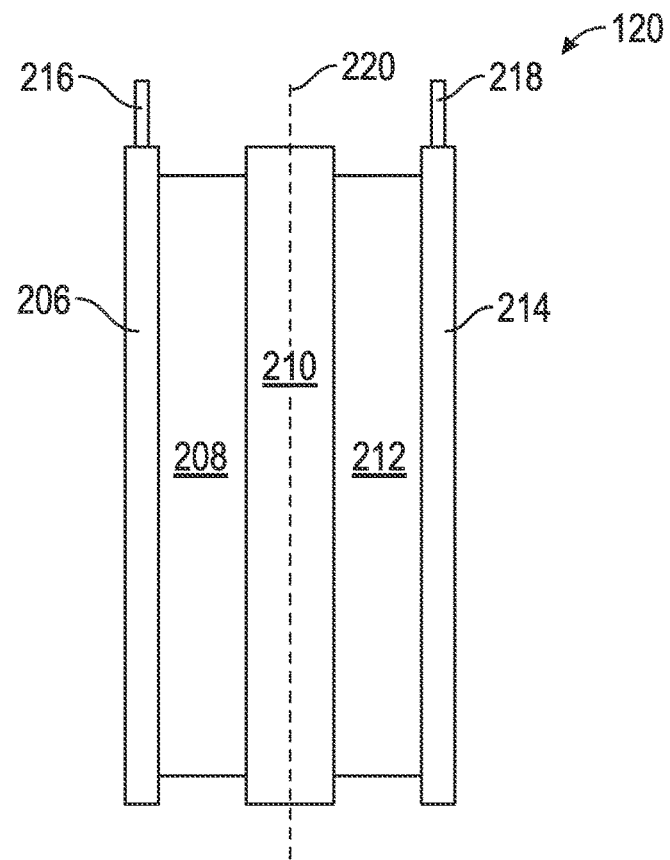
FIG. 2C illustrates a cross-sectional end view of a battery cell in accordance with one or more implementations.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cells 120 are implemented as lithium-ion battery cells, some or all of the battery cells 120 in a battery module 115, battery pack 110, or other battery or battery unit may be implemented using other battery cell technologies, such as nickel-metal hydride battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials.

Figure 2D:
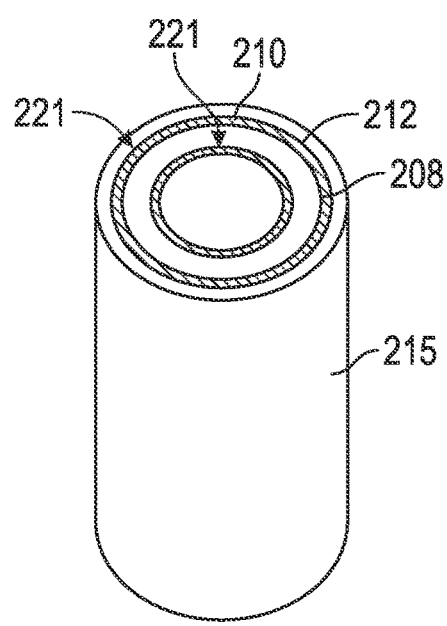
FIG. 2D illustrates a cross-sectional perspective view of a cylindrical battery cell in accordance with one or more implementations.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 215 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220) may be disposed within the cell housing 215. For example, a separator layer may be disposed between adjacent ones of the windings 221. However, the cylindrical cell implementation of FIG. 2D is merely illustrative, and other implementations of the battery cells 120 are contemplated.

Figure 2E:
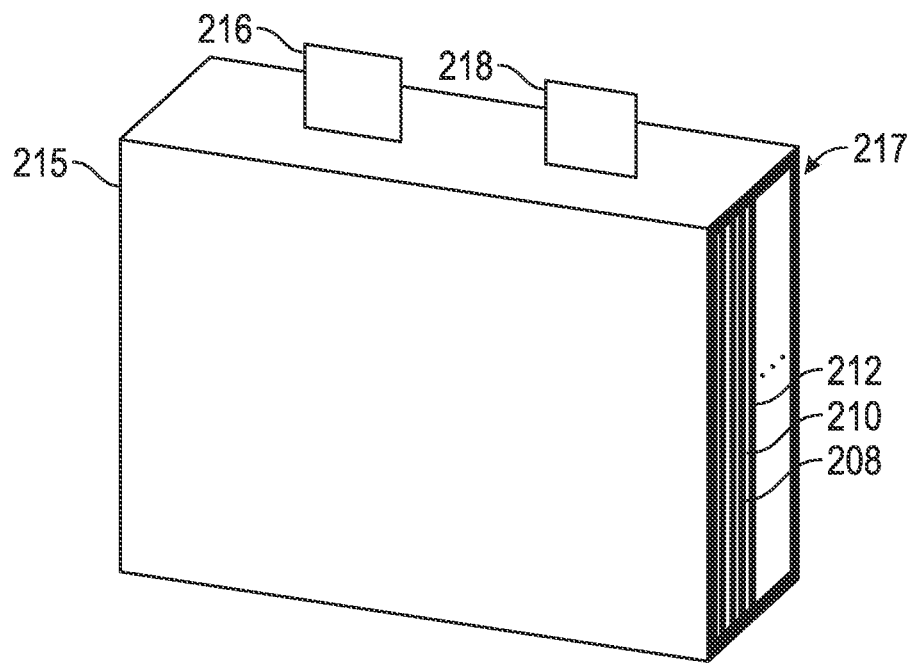
FIG. 2E illustrates a cross-sectional perspective view of a prismatic battery cell in accordance with one or more implementations.

For example, FIG. 2E illustrates an example in which the battery cell 120 is implemented as a prismatic cell. As shown in FIG. 2E, the battery cell 120 may have a cell housing 215 having a right prismatic outer shape. As shown, one or more layers of the anode 208, the cathode 212, and the electrolyte 210 disposed therebetween may be disposed (e.g., with separator materials between the layers) within the cell housing 215 having the right prismatic shape. As examples, multiple layer of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 215 having the right prismatic shape. In the implementation of FIG. 2E, the cell housing 215 has a relatively thick cross-sectional width 217 and is formed from a rigid material. For example, the cell housing 215 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 215 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 215 (e.g., a glass to metal feedthrough) as the conductor passes through to cell housing 215 to expose the first terminal 216 and the second terminal 218 outside the cell housing 215 (e.g., for contact with an interconnect structure 200 of FIG. 2B). However, this implementation of FIG. 2E is also illustrative and yet other implementations of the battery cell 120 are contemplated.

Figure 2F:
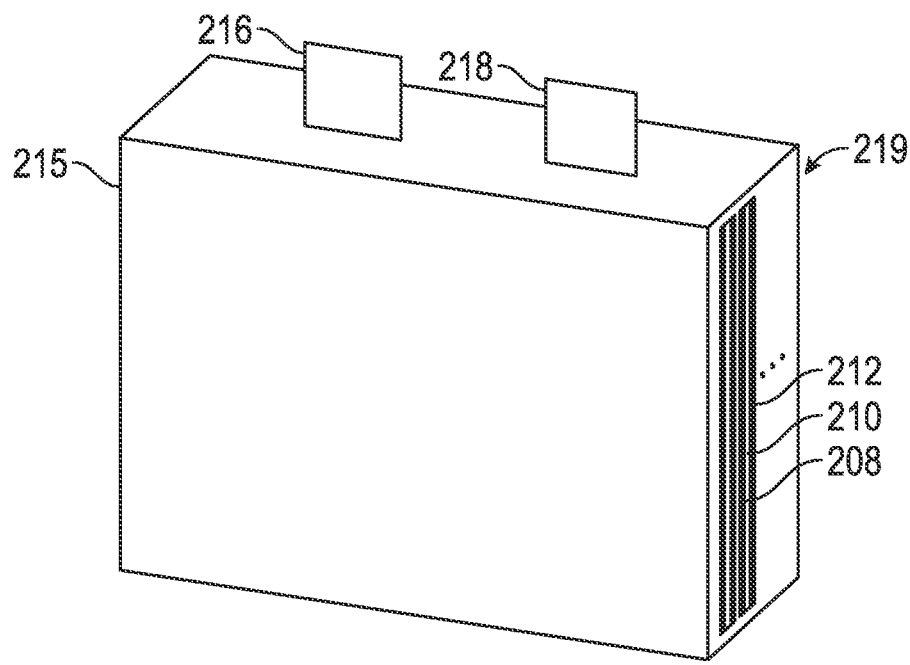
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 215 that forms a flexible or malleable pouch housing. In the implementation of FIG. 2F, the cell housing 215 has a relatively thin cross-sectional width 219. For example, the cell housing 215 in the implementation of FIG. 2F may be formed from a flexible or malleable material (e.g., a foil, such as a metal foil, or film, such as an aluminum-coated plastic film). For example, the cross-sectional width 219 of the cell housing 215 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 215 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery or battery subassembly may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 215 of the battery cell 120 can be disposed in the battery module 115, the battery pack 110, or installed in any of the vehicle 100, the building 180, or any other electrically powered component or device.

Figure 3:
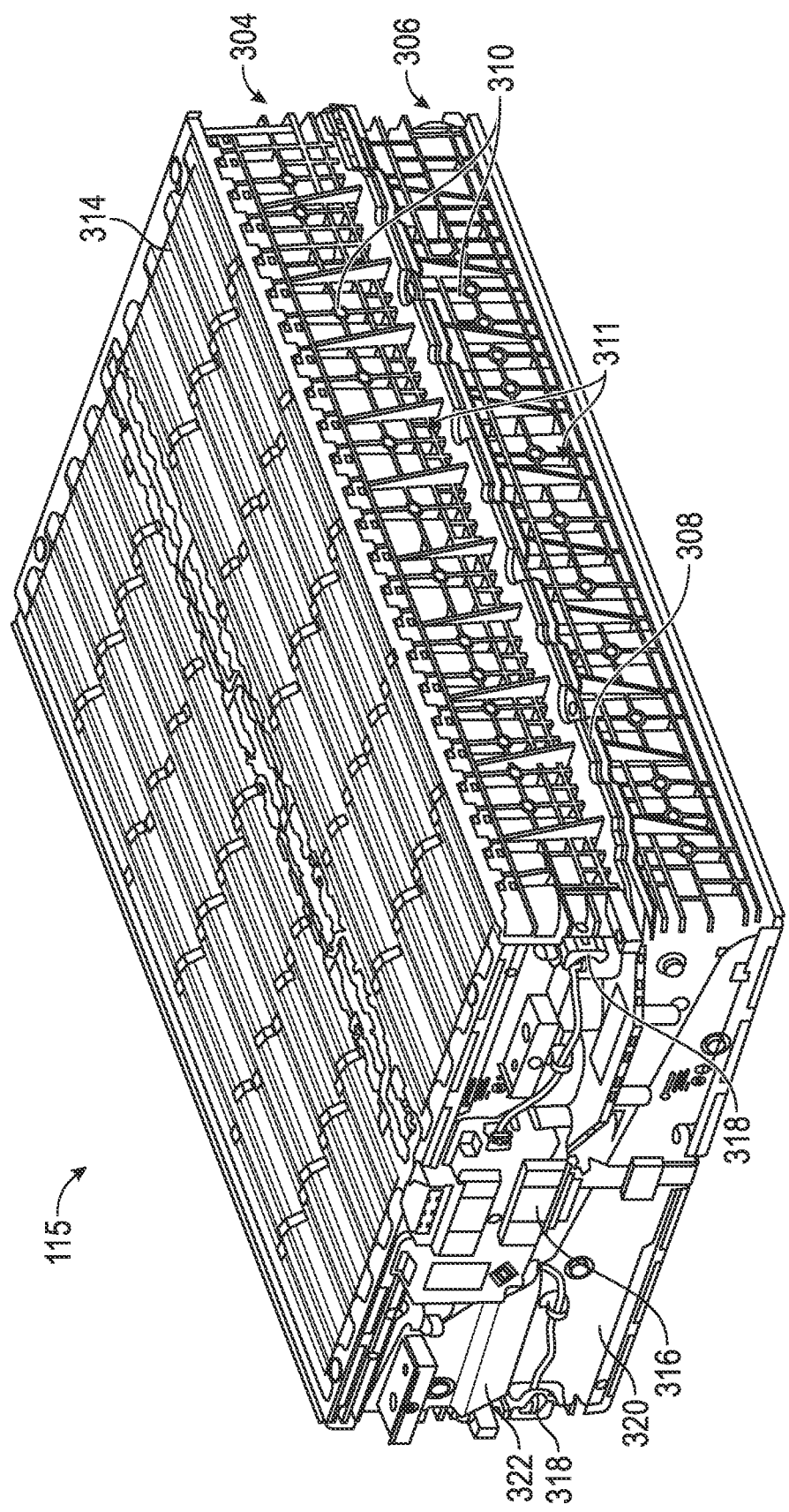
FIG. 3 illustrates a perspective view of a battery module in accordance with one or more implementations.

FIG. 3 illustrates a perspective view of a battery module in accordance with one or more implementations. In the example of FIG. 3, the battery module 115 includes a top submodule 304 and a bottom submodule 306. As shown, each of the top submodule 304 and the bottom submodule 306 may include a cell carrier 310. In one or more implementations, each cell carrier 310 may be a monolithic unitary body (e.g., a molded body formed from plastic and/or other materials), and may include structural features 311 along the sidewalls thereof. These structural features 311 may reinforce the strength of the sidewalls of the carrier, and thereby reduce or eliminate the need for additional structural reinforcing components for the battery module 115, such as shear walls attached to the cell carriers 310. Also visible in FIG. 3 is a cold plate 308 that is disposed between the top submodule 304 and the bottom submodule 306. The cold plate 308 may be in thermal contact with battery cells (not visible in FIG. 3) in the top submodule 304 and battery cells (not visible in FIG. 3) in the bottom submodule 306, to provide thermal control for both the top submodule 304 and the bottom submodule 306.

FIG. 3 also illustrates a cover 314 that may be disposed on a top and/or a bottom of the battery module 115. FIG. 3 also illustrates a balancing voltage and temperature (BVT) module 316 to which multiple thermistor assemblies 318 are communicatively coupled. The BVT can be a modular assembly of various electrical components to monitor or control components of the battery subassembly. For example, the BVT can include a circuit board that is attached to the housing of the BVT. The BVT can have various connectors to couple with, for example, a thermistor that can measure a temperature of the battery subassembly, battery module and/or a battery cell thereof, a voltage sensor or balancer that can sense or control voltage that flows through the battery subassembly, battery module and/or a battery cell thereof, or a communication device that can receive, transmit, or analyze data associated with the battery subassembly, battery module and/or a battery cell thereof. Also shown in FIG. 3 are a busbar 320 (e.g., a positive busbar) that is electrically coupled to first terminals (e.g., the positive terminals) of the battery cells of the top submodule 304 and the bottom submodule 306, and a busbar 322 (e.g., a negative busbar) that is electrically coupled to second terminals (e.g., the negative terminals) of the battery cells of the top submodule 304 and the bottom submodule 306.

Figure 4:
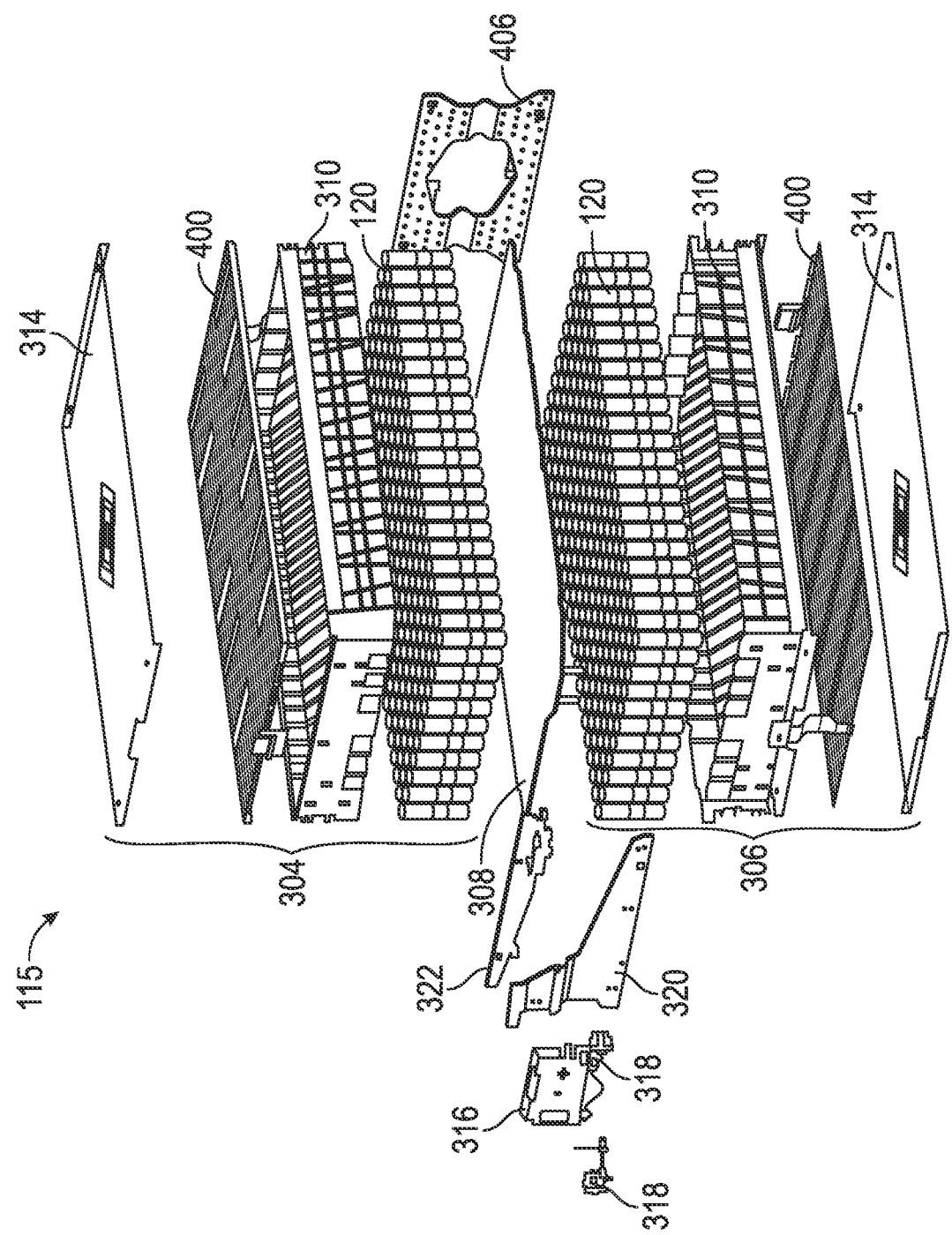
FIG. 4 illustrates an exploded perspective view of the battery module of FIG. 3 in accordance with one or more implementations.

FIG. 4 illustrates an exploded perspective view of the battery module 115 of FIG. 3, in which the battery cells 120 of the top submodule 304 and the battery cells 120 of the bottom submodule 306 can be seen. In one or more examples described herein, the battery module 115, a subset of the components of the battery module 115 (e.g., the top submodule 306, the bottom submodule 306, and/or another subset of the components of the battery module) shown in FIG. 3 and/or FIG. 4, or any other grouping of battery cells (e.g., including a battery pack that includes multiple battery modules and/or other battery subassemblies) may be referred to as a battery subassembly.

In the example of FIG. 4, two current collector assemblies (CCAs) 400 are also visible which, when the battery module 115 is assembled, connect the terminals of the battery cells 120 of the top submodule 304 and the bottom submodule 306 to the busbar 320 and the busbar 322. As shown in FIG. 4, a series busbar 406 may also be provided (e.g., on an opposing end of the cell carriers 310 from the end of the cell carriers at which the busbar 320 and the busbar 322 are mounted). For example, the series busbar 406 may electrically couple the battery cells 120 of the top submodule 304 to the battery cells 120 of the bottom submodule 306. As shown, a cover 314 may be provided for the top submodule 304 and a cover 314 may be provided for the bottom submodule 306.

As discussed in further detail hereinafter, the battery cells 120 of the top submodule 304 may be inserted into a crate structure formed by the cell carrier 310 of the top submodule 304, and the battery cells 120 of the bottom submodule 306 may be inserted into a crate structure formed by the cell carrier 310 of the bottom submodule 306. As shown in FIGS. 3 and 4, the orientation of the cell carrier 310 and the battery cells 120 of the top submodule 304 may be substantially opposite (e.g., upside down with respect) to the orientation of the cell carrier 310 and the battery cells 120 of the bottom submodule 306. In this way, the single cold plate 308 can be in thermal contact with the same ends (e.g., bottom ends) of the battery cells 120 of both the top and bottom submodules, and provide substantially symmetric thermal contact with the top and bottom submodules.

Figure 5:
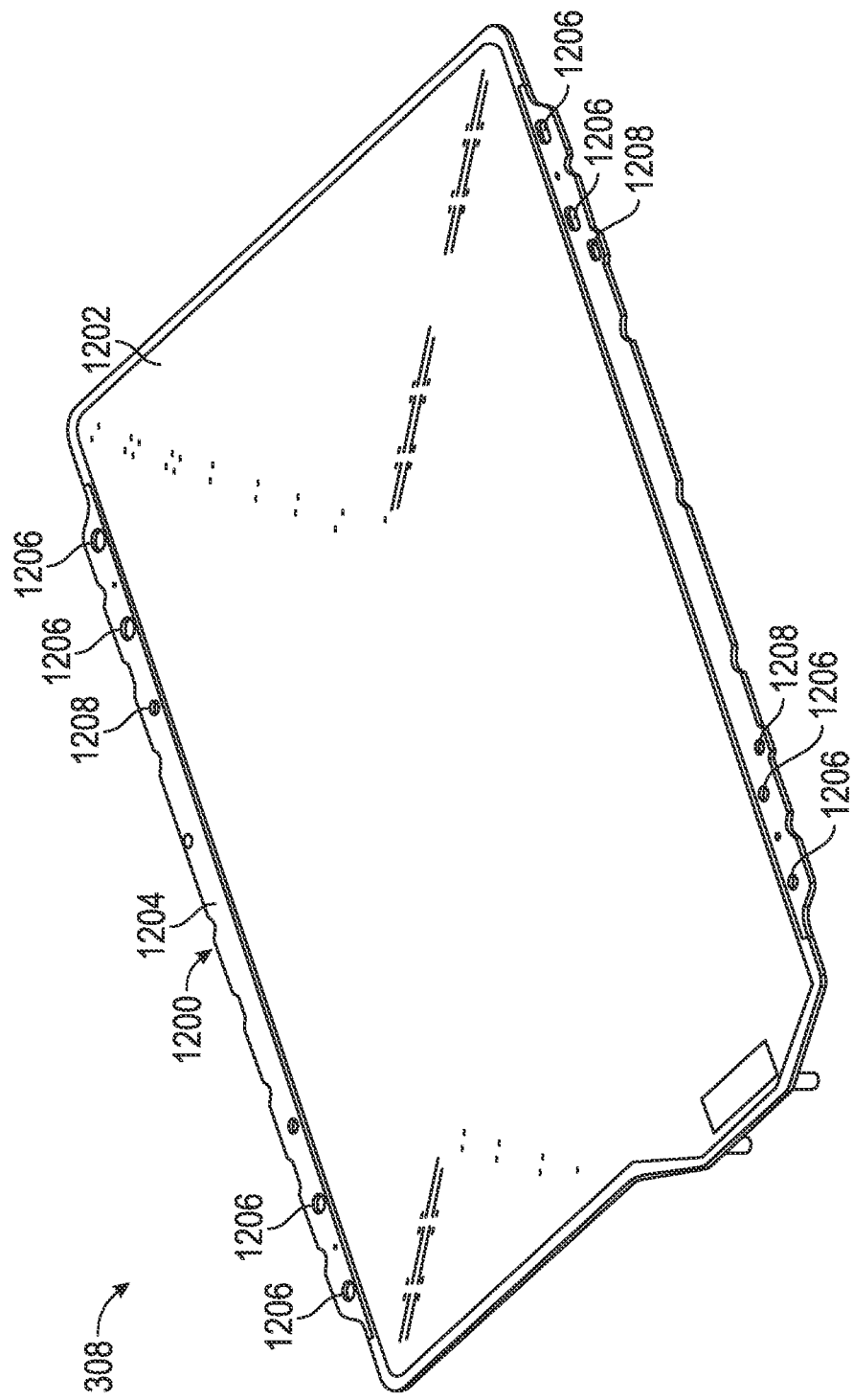
FIG. 5 illustrates a top perspective view of a cold plate in accordance with one or more implementations.

FIG. 5 illustrates a top perspective view of a thermal component (e.g., a cold plate) for a battery module in accordance with one or more implementations. As shown in FIG. 5, the cold plate 308 may include a plate assembly 1200. The plate assembly 1200 may include a flange 1204 along one or more edges thereof. In one or more implementations, one or more locating features 1206 (e.g., for a cell carrier 310) and/or one or more locating (e.g., datuming) features 1208 may be formed along the flange 1204. In one or more implementations, a thermally conductive material 1202 (e.g., a thermally conductive adhesive) may be formed on a substantially planar outer surface of the plate assembly 1200. In one or more other implementations, the thermally conductive adhesive may be multi-part acrylic paste. In the example of FIG. 5, the thermally conductive material 1202 can be seen on one side of the cold plate 308, for thermally coupling to the battery cells 120 of a first submodule (the bottom submodule 306). In one or more implementations, the thermally conductive material 1202 may also be disposed on the other side of the cold plate 308 that is not visible in FIG. 5, for thermally coupling to the battery cells 120 of a second submodule (the top submodule 304).

Figure 6:
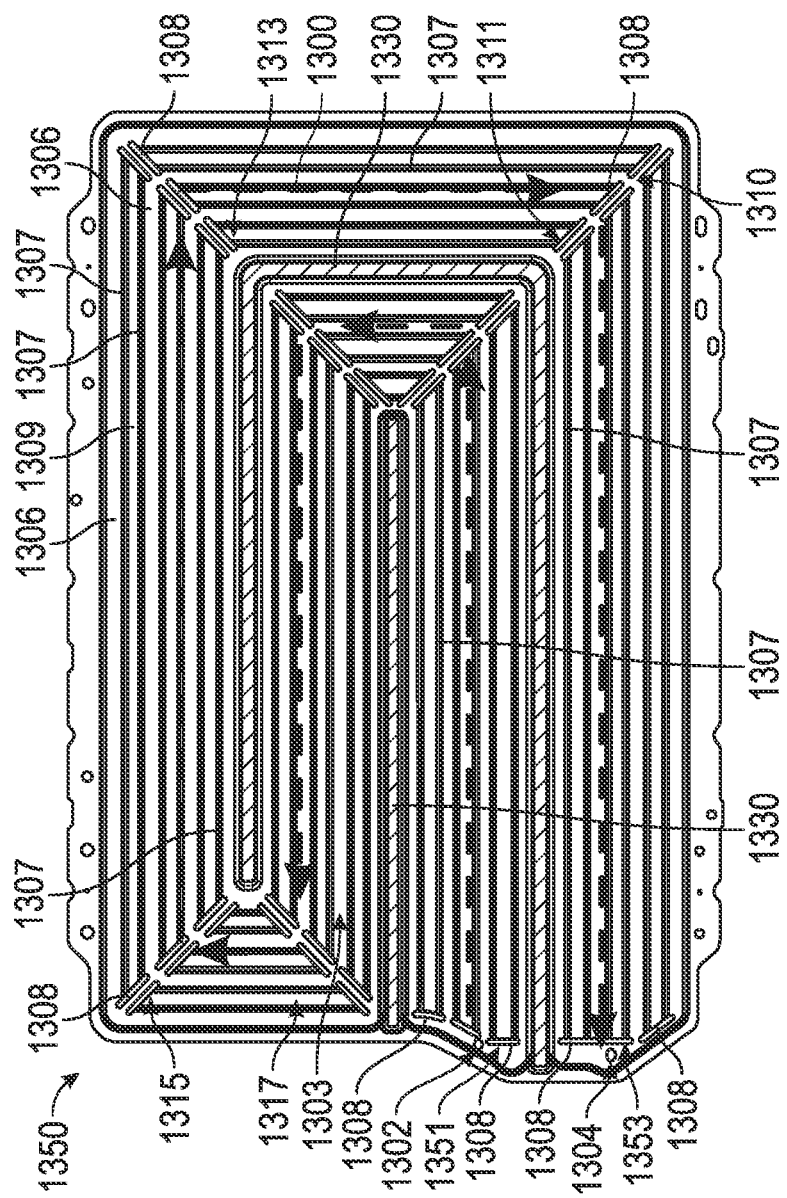
FIG. 6 illustrates a top view of a portion of a cold plate in accordance with one or more implementations.

FIG. 6 illustrates a top view of a portion of a thermal component (e.g., a cold plate) for a battery module in accordance with one or more implementations. For example, FIG. 6 illustrates a middle plate 1350 of a plate assembly 1200 having a top plate, a bottom plate (not visible in FIG. 13, see, e.g., FIG. 14), and a middle plate disposed between the top plate and the bottom plate. As shown in FIG. 6, in one or more implementations, the middle plate 1350 may define a serpentine flow path 1300 for a fluid (e.g., a thermal fluid, such as a coolant fluid or a warming fluid) from an inlet port 1302 to an outlet port 1304. For example, the serpentine flow path 1300 may define and/or be defined within a plane. For example, the cold plate 308 may include one or more structural features 1307 that extend across (e.g., through) the serpentine flow path (e.g., across, or through, the plane). For example, the structural features 1307 may increase a burst pressure threshold of the cold plate. The structural features 1307 may prevent compression of the cold plate by external forces and/or may prevent swelling of the cold plate due to fluid pressure within the cold plate.

The structural features 1307 may separate some portions of the serpentine flow path 1300 from some other portions of the serpentine flow path 1300. For example, the plurality of structural features 1307 may separate a plurality of sub-channels 1306 that are partially defined by the structural features 1307. As shown, the sub-channels 1306 may define the serpentine flow path 1300 on a first side 1303 of the middle plate 1350 (e.g., the side of the middle plate 1350 that is visible in FIG. 6). As shown, multiple sub-channels 1306 may combine to form each of several segments of the serpentine flow path 1300. For example, the segments may include linear segments that run between turns or corners of the serpentine flow path 1300.

In one or more implementations, the sub-channels 1306 within each segment of the serpentine flow path 1300 may be separated from each other by the structural feature 1307 along the length of the segment, and may be fluidly coupled together at or near the ends of each segment. As shown, each segment of the serpentine flow path 1300 (e.g., each comprising multiple sub-channels 1306) may be fluidly separated from an adjacent, parallel segment of the serpentine flow path 1300, by a fluid barrier 1330 that at least partially defines the serpentine flow path 1300.

In one or more implementations, the structural features 1307 may each extend from a floor of a corresponding sub-channel 1306 to a respective ridge 1309. As discussed in further detail herein after (e.g., in connection with FIG. 7), each ridge 1309 may form an additional sub-channel of an additional serpentine flow path on an opposing second side of the plate (not visible in FIG. 6). As shown, the structural features 1307 may include structural features formed in segments, including first segments that extend from the inlet port 1302 to a first central portion of the middle plate 1350, segments that extend perpendicularly to the first segments from the first central portion to a second central portion of the middle plate 1350, third segments that extend perpendicularly to the first segments and parallel to the first segments from the second central portion to a first edge portion of the middle plate 1350, fourth segments that extend perpendicularly to the third segments from the first edge portion to a first corner of the middle plate 1350, fifth segments that extend perpendicularly to the fourth segments and parallel to the third segments from the first corner of the middle plate 1350 to a second corner of the middle plate

1350, sixth segments that extend perpendicularly to the fifth segments from the second corner to a third corner of the middle plate 1350, and seventh segments that extend perpendicularly to the sixth segments from the third corner of the middle plate 1350 to the outlet portion 1304. As shown in FIG. 6, the middle plate 1350 may include one or more openings 1308. As shown, the first, second, third, fourth, fifth, sixth, and seventh segments of the structural features 1307 may be separated from each other by a gap at which one or more of the openings 1308 are formed. Openings 1308 may be configured to allow a cooling fluid to flow through the middle plate 1350 (e.g., between the serpentine flow path 1300 on the first side of the plate and an additional serpentine flow path on the opposing second side of the middle plate 1350). In this way, cooling fluid that is flowing through the serpentine flow path 1300 can cross to an opposite side of the middle plate 1350, and vice versa. In one or more implementations, the openings 1308 may be configured (e.g., sized, shaped, and/or positioned) to generate a turbulence in a flow of the fluid through the serpentine flow path 1300. For example, the turbulence may increase a heat transfer efficiency of the fluid (e.g., to the top plate and the bottom plate).

As shown in FIG. 6, a first set 1311 of the openings 1308 may be arranged in a first row that extends from a first corner of the cold plate diagonally away from first and second edges of the cold plate that define the first corner. For example, the first set 1311 of the openings 1308 may be located at a turn (e.g., a corner) in the serpentine flow path 1300 (e.g., to increase the amount of mixing across the middle plate 1350 and/or to increase an amount of turbulence in the cooling fluid flowing through the serpentine flow path 1300). As shown, a second set 1313 of the openings 1308 may be arranged in a second row that extends, from a second corner of the cold plate toward an inner end of the first row and diagonally away from the second edge and a third edge of the cold plate that define the second corner (e.g., at another turn or corner in the serpentine flow path 1300).

As shown, a third set 1315 of the openings 1308 may be arranged in a third row that extends from a third corner of the cold plate diagonally away from the third edge and a fourth edge of the cold plate that define the third corner (e.g., at yet another turn or corner in the serpentine flow path 1300). As shown, a fourth set 1317 of the openings 1308 may be arranged in a fourth row that extends from a location along the fourth edge of the cold plate toward an inner end of the third row (e.g., at still another turn or corner in the serpentine flow path 1300). In one or more implementations, the middle plate 1350 may include one or more openings 1308 (e.g., one or more rows of openings 1308) at each corner or turn of the serpentine flow path 1300. In one or more implementations, the middle plate 1350 may include a row of openings 1308 at the beginning of each linear segment of the serpentine flow path 1300 and a row of openings 1308 at the end of each linear segment of the serpentine flow path 1300. In one or more implementations, the row of openings 1308 at the beginning of each linear segment of the serpentine flow path 1300 may be parallel to the row of openings 1308 at the end of a next linear segment of the serpentine flow path 1300 (e.g., such that each row of openings 1308 forms a row of parallel pairs of openings). In the example of FIG. 6, the openings 1308 each form a slot (e.g., an elongated narrow opening) in the middle plate 1350. In one or more other implementations, one or more of the openings 1308 may have one or more other shapes, different from the slot shape shown in FIG. 6.

In the example of FIG. 6, the serpentine flow path 1300 includes four sub-channels 1306 (e.g., separated by three ridges 1309) that each traverse the entire serpentine flow path 1300 and that are fluidly coupled together at each turn or corner (e.g., at the end of each linear segment) of the serpentine flow path 1300. However, this is merely illustrative and, in other implementations, the serpentine flow path 1300 may include fewer or more than four sub-channels 1306 (e.g., separated by fewer or more than three ridges 1309) that each traverse some or all of the entire serpentine flow path 1300 and that may be fluidly separate or fluidly coupled together at one or more turns or corners or other locations along the serpentine flow path 1300.

As shown, the openings 1308 may include openings 1308 that are located away from the inlet port 1302 and the outlet port 1304, and may include a fifth set 1351 of openings 1308 at or near the inlet port 1302. For example, by providing the openings 1308 at or near the inlet port 1302, a portion the cooling fluid that is introduced into the cold plate 308 via the inlet port 1302 on a first side of the middle plate 1350 can immediately cross (e.g., through the openings 1308 at or near the inlet port 1302) to the other side of the middle plate 1350. In this way, the openings 1308 at or near the inlet port 1302 may facilitate a concurrent initiation of flow of the cooling fluid (e.g., upon introduction into the cold plate 308 via the inlet port 1302 and before the cooling fluid travels to the end of the serpentine flow path 1300 on the first side of the plate) through a first serpentine flow path (e.g., serpentine flow path 1300) on a first side 1303 of the middle plate 1350 and a second serpentine flow path (e.g., a second serpentine flow path that mirrors the serpentine flow path 1300) on an opposing second side of the middle plate 1350. In this way, the thermal control provided by the cold plate 308 may be provided sooner, and thus more efficiently, to the battery cells 120 on both sides of the cold plate 308 (e.g., in the top submodule 304 and the bottom submodule 306), which may facilitate more efficient and/or more reliable power delivery from the battery cells 120. As shown, the middle plate 1350 may also include a sixth set 1353 of the openings 1308 at or near the outlet port 1304.

Figure 7:
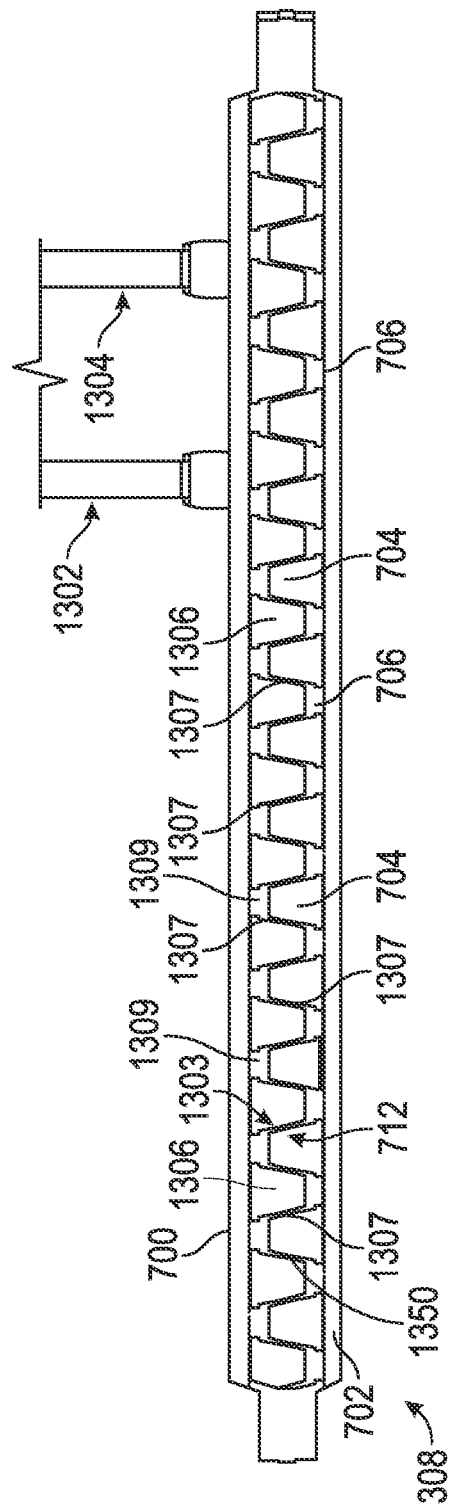
FIG. 7 illustrates a cross-sectional side view of a cold plate in accordance with one or more implementations.

FIG. 7 illustrates a cross-sectional side view of the cold plate 308 in accordance with one or more implementations. As shown in FIG. 7, in one or more implementations, the cold plate 308 may be formed from a top plate 700, a bottom plate 702, and the middle plate 1350 disposed between the top plate 700 and the bottom plate 702. As shown, the sub-channels 1306 are formed on a first side 1303 of the middle plate 1350. As shown in FIG. 7, one or more of the structural features 1307 may each extend from a floor of a corresponding sub-channel 1306 to a respective ridge 1309. FIG. 7 also shows how each ridge 1309 (e.g., the opposite side of each ridge 1309) forms an additional sub-channel 704 of an additional serpentine flow path on an opposing second side 712 of the middle plate 1350. FIG. 7 also shows how the floor of each sub-channel 1306 on the first side 1303 of the middle plate 1350 may correspond to a ridge 706 on the opposing second side 712 of the middle plate 1350. For example, the structural features 1307 may be formed by undulations in the middle plate 1350. For example, as illustrated in FIG. 7, each of multiple undulations in the middle plate 1350 may for a respective one of the structural features 1307, which may include a respective ridge 1309, a respective ridge 706, and the portion of the middle plate 1350 that extends, through the serpentine flow path 1300, from the respective ridge 1309 and the respective ridge 706. In one or more implementations, the ridges 1309 may be attached (e.g., brazed or welded) to the top plate 700. These brazes and/or welds may separate the sub-channels 1306 from each other. In one or more implementations, the ridges 706 on the opposing second side 712 of the middle plate 1350 may be attached (e.g., brazed or welded) to the bottom plate 702. These brazes and/or welds may separate the sub-channels 704 from each other.

As illustrated in the example of FIG. 7, the cold plate 308 may include a plurality of structural features 1307 that are formed from undulations in the middle plate 1350 and each extend from a floor of a corresponding sub-channel 1306 to a respective ridge 1309. As shown each of the structural features 1307 may include a respective one of the ridges 1309, and each ridge 1309 may form an additional sub-channel 704 of an additional serpentine flow path on an opposing second side 712 of the middle plate 1350.

Figure 8:
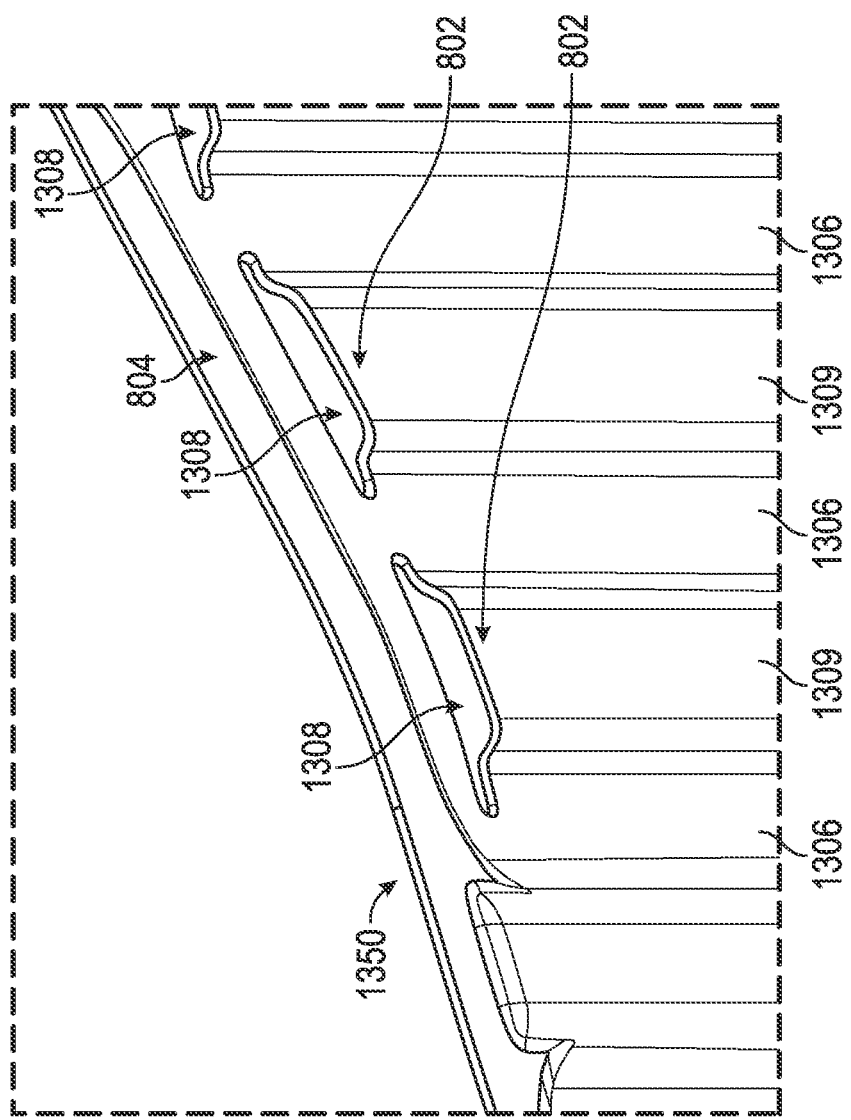
FIG. 8 illustrates a perspective view of a portion of a middle plate of a cold plate in the vicinity of openings in the middle plate in accordance with one or more implementations.
Figure 9:
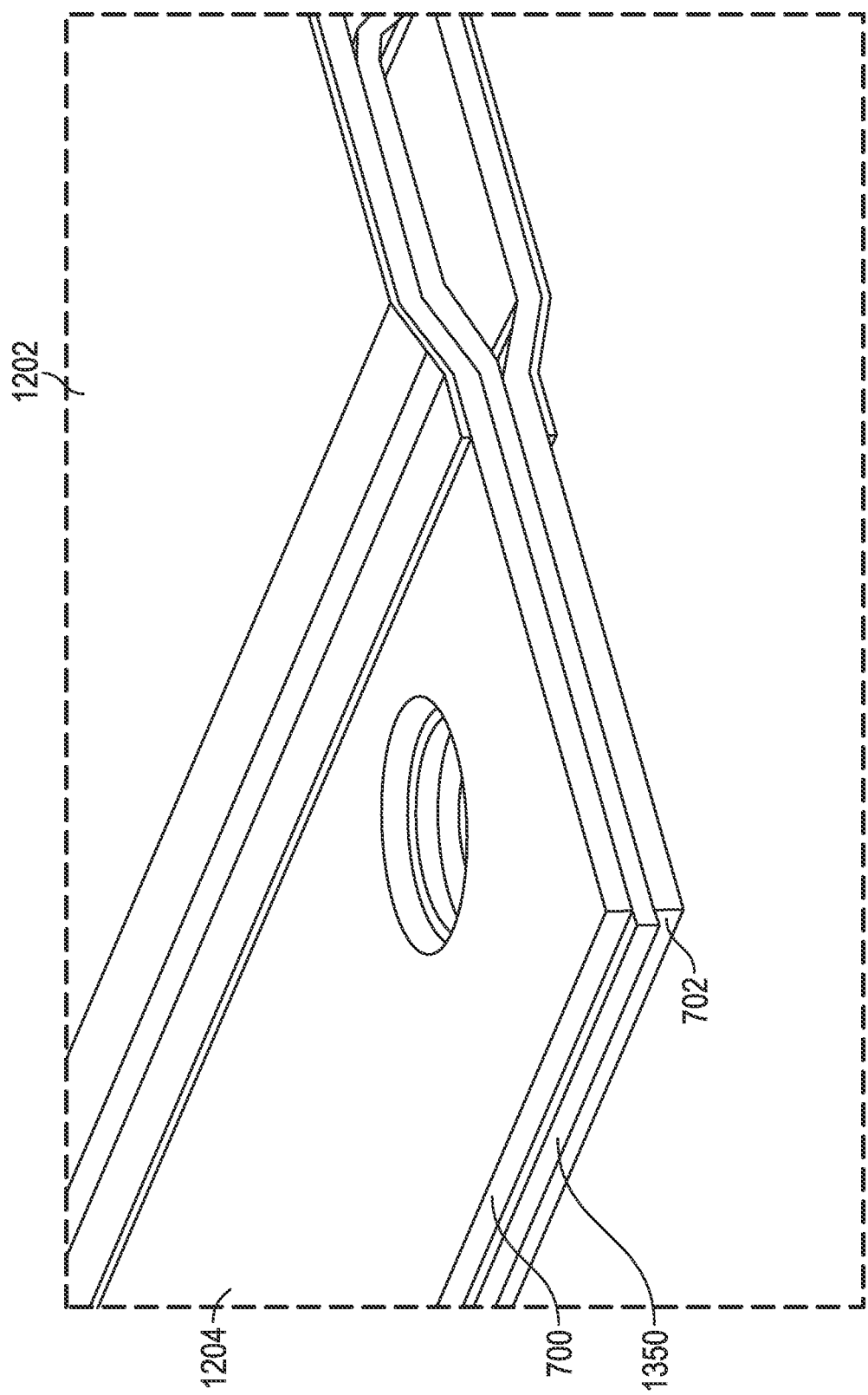
FIG. 9 illustrates a cross-sectional view of a portion of a flange of a cold plate in accordance with one or more implementations.

FIG. 8 illustrates a perspective view of a portion of the middle plate 1350 in the vicinity of some of the openings 1308. As shown, in one or more implementations, one or more of the openings 1308 may be formed at the end(s) 802 of one or more of the ridges 1309. FIG. 8 also illustrates how two or more of the sub-channels 1306 may be fluidly coupled together at or near the ends 802 of the ridges 1309 (e.g., along a portion 804 of the middle plate that extends between the ends of the sub-channels in a direction substantially perpendicular to the sub-channels). FIG. 9 illustrates a cross-sectional perspective view of a portion of the cold plate 308, showing how the flange 1204 may be formed by an end portion of the middle plate 1350 that is between, and in contact with (e.g., attached to, such as welded to), a corresponding end of the top plate 700 and a corresponding end of the bottom plate 702. As shown, features of the flange, such as the locating features 1206 and/or the locating features 1208 of FIG. 5, may be formed in (e.g., extend through) the top plate 700, the middle plate 1350, and the bottom plate 702.

Figure 10:
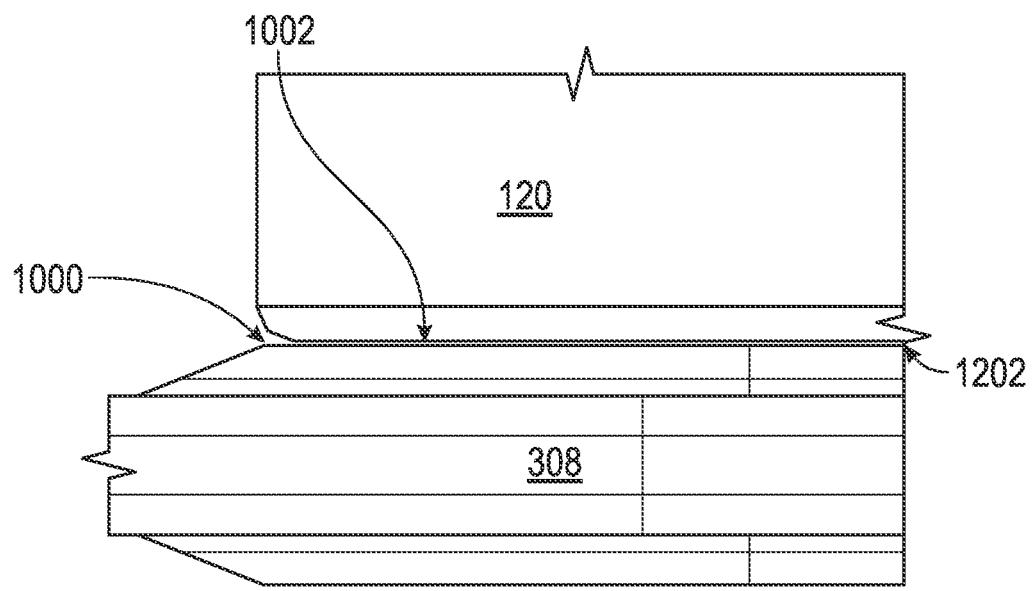
FIG. 10 illustrates a side view of a portion of a cold plate attached to a battery cell in accordance with one or more implementations.
Figure 12:
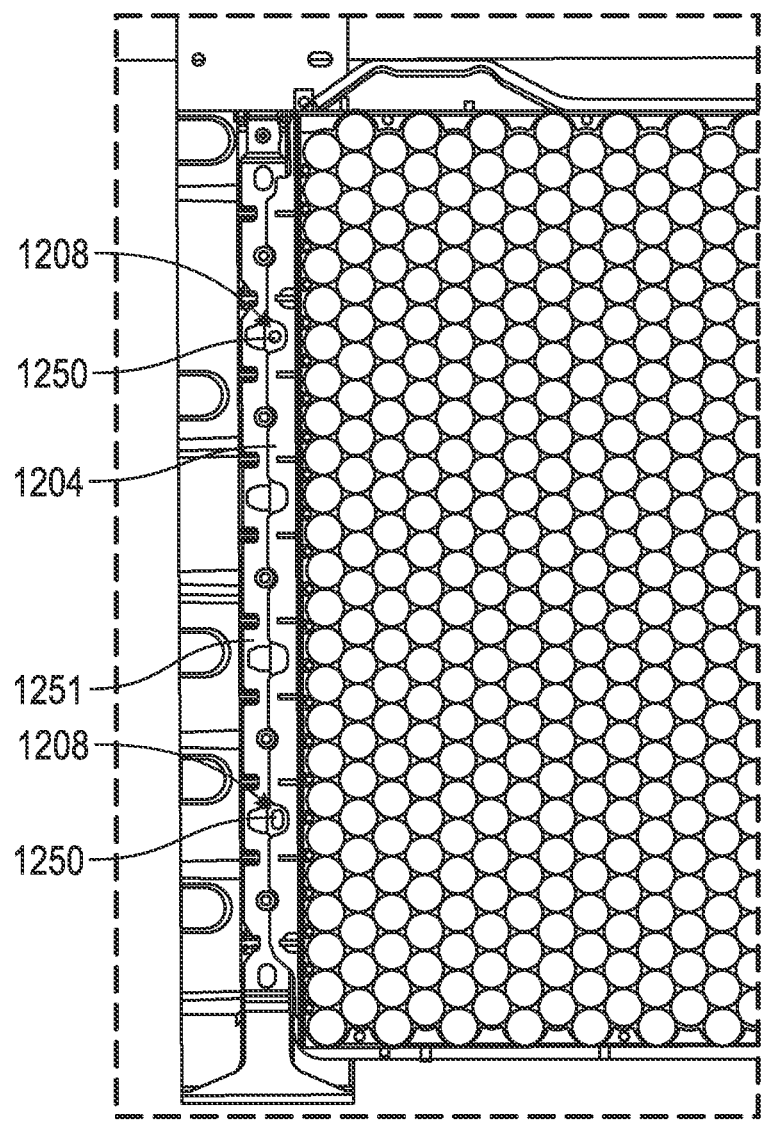
FIG. 12 illustrates a top view of a cold plate having locating features in accordance with one or more implementations.

FIG. 10 illustrates a side view of a portion of the cold plate 308 to which a battery cell 120 is attached, in accordance with one or more implementations. For example, the thermally conductive material 1202 may include an adhesive that attaches a bottom end of a battery cell 120 to the cold plate 308. In the example of FIG. 12, the battery cell 120 may be an outermost battery cell of a group of battery cells (e.g., in a battery sub-assembly, such as the top submodule 304 or the bottom submodule 306 described herein). As shown, the battery cell 120 (e.g., the bottom surface of the battery cell 120) may each be disposed within an outer boundary of 1000 a thermal contact surface 1002 of the cold plate 308 (e.g., the outer edge of an outermost battery cell 120 may be substantially aligned with the outer boundary 1000 of the thermal contact surface 1002). For example, the thermal contact surface 1002 may be the outer surface of the thermally conductive material 1202 (e.g., a thermally conductive adhesive). In this way, the entire bottom surface of each battery cell 120 may be in thermal contact with the cold plate 308 (e.g., with the thermally conductive material 1202), which can prevent or avoid reduced thermal control for the outer rows/columns of battery cells 120 in a battery subassembly).

Figure 11:
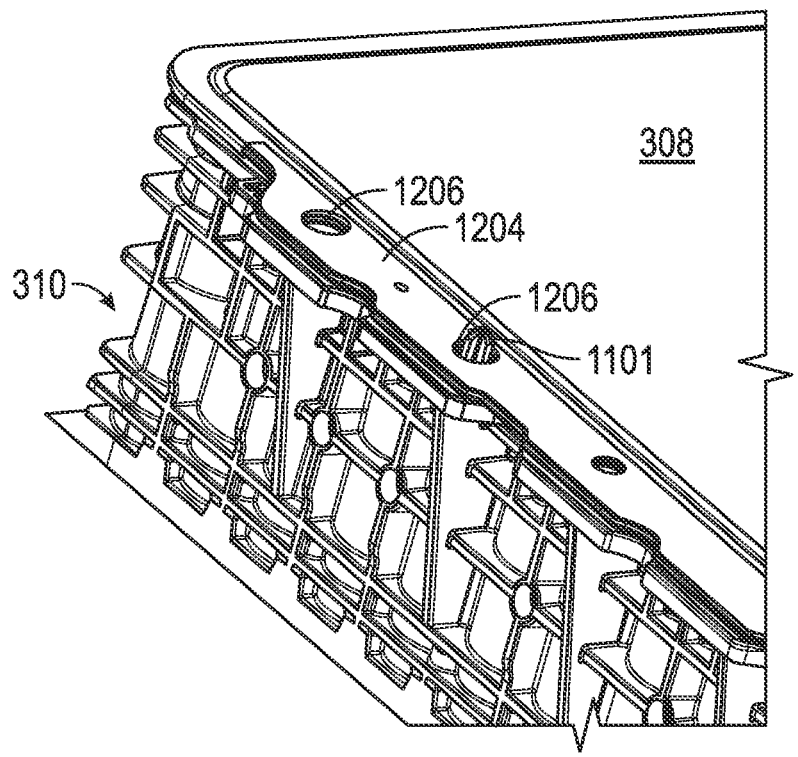
FIG. 11 illustrates a perspective bottom view of a partially assembled battery module having a cold plate with locating features in accordance with one or more implementations.

FIG. 11 illustrates a perspective bottom view of a partially assembled battery module 115 having a cold plate 308 with locating features 1206 in accordance with one or more implementations. As shown, the locating features 1206 may include openings that receive a pin 1101 or other protrusion on a cell carrier 310 (e.g., a cell carrier 310 of the top submodule 304 or the bottom submodule 306 described herein). In the example of FIG. 11, the pin 1101 of the cell carrier 310 is received in an inboard locating feature 1206 of two locating features 1206. Although not shown in FIG. 11, another cell carrier 310, oriented oppositely to the orientation of the cell carrier 310 that is shown in FIG. 11 (e.g., a cell carrier 310 of the other of the top submodule 304 or the bottom submodule 306 described herein), may have a locating pin that is received in the outboard locating feature 1206. In this way, the locating features 1206 of the cold plate 308 may be used to locate the top submodule 304 and the bottom submodule 306 of the battery module 115 to the cold plate 308.

FIG. 12 illustrates a top view of the cold plate 308 showing how locating features 1208 (e.g., datuming features) may be used to locate the cold plate 308 (and/or a battery module 115 or other battery subassembly within which the cold plate 308 is disposed) relative to one or more battery pack structures. For example, locating features 1208 (e.g., datuming features) may be used to locate the cold plate 308 (and/or a battery module 115 or other battery subassembly within which the cold plate 308 is disposed) relative to a cross member 1251 that extends between battery modules 115 within a battery pack 110. As shown, the locating features 1208 may include openings or notches that allow positioning equipment (e.g., a camera or other sensor of positioning equipment that can lift and/or move the cold plate 308 and/or the battery module 115 within which the cold plate 308 is disposed) to view one or more locating features 1250 on the cross member 1100 or another battery pack structure. For example, positioning equipment that includes a camera or other sensor may lift a battery module 115 that includes a cold plate 308, and may track the location of the locating features 1250 relative to the locating features 1208 while placing the battery module containing the cold plate 308 in position relative to the cross member 1251 (e.g., for attachment to the cross member 1251 and/or other battery pack structures).

Figure 13:
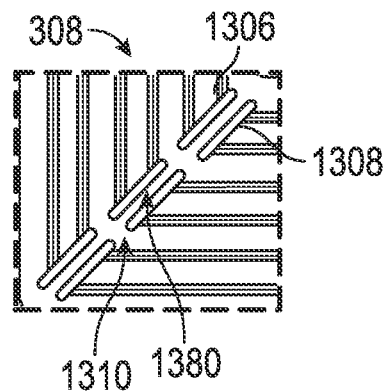
FIG. 13 illustrates a top view of a portion of a cold plate having openings in a middle plate in accordance with one or more implementations.

As illustrated by, for example, FIGS. 5, 9, 11 and 12, in one or more implementations, the cold plate 308 includes a flange 1204 that extends along an edge of the cold plate 308, outside of the serpentine flow path 1300. The flange may include one or more locating features 1206 for attaching the cold plate to one or more cell carriers 310 for a battery module 115. In one or more implementation (e.g., as shown in FIGS. 3 and 4), the cold plate 308 may be disposed between two groups of battery cells, such as between a pair of battery modules (e.g., a top module 304 and a bottom module 306 of a battery module 115) in an electric vehicle (e.g., vehicle 100). FIG. 13 illustrates a top view of a portion of the cold plate 308 showing how the openings 1308 may be separated by a gap 1310 and a gap 1380 in one or more implementations.

Figure 14:
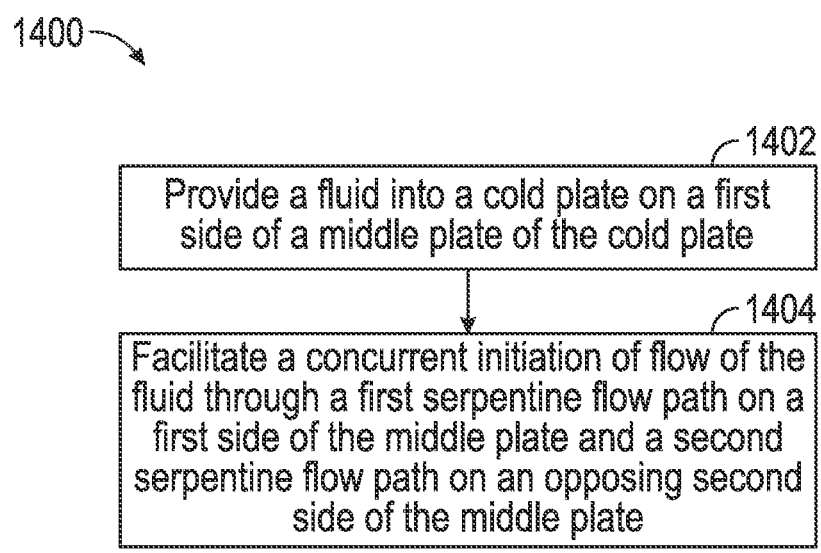
FIG. 14 is a flow chart of illustrative operations that may be performed for providing thermal control with a cold plate in accordance with one or more implementations.

FIG. 14 illustrates a flow diagram of an example process 1400 that may be performed for providing thermal control using a cold plate, in accordance with implementations of the subject technology. For explanatory purposes, the process 1400 is primarily described herein with reference to the cold plate 308 of FIGS. 5-13. However, the process 1400 is not limited to cold plate 308 of FIGS. 5-13, and one or more blocks (or operations) of the process 1400 may be performed by one or more other structural components of other suitable apparatuses, devices, or systems. Further for explanatory purposes, some of the blocks of the process 1400 are described herein as occurring in serial, or linearly. However, multiple blocks of the process 1400 may occur in parallel. In addition, the blocks of the process 1400 need not be performed in the order shown and/or one or more blocks of the process 1400 need not be performed and/or can be replaced by other operations.

As illustrated in FIG. 14, at block 1402, a fluid, such as a cooling fluid, may be provided into a cold plate (e.g., cold plate 308) on a first side (e.g., first side 1303) of a middle plate (e.g., middle plate 1350) of the cold plate. For example, the fluid may be provided into a cavity within the cold plate (e.g., a cavity between a top plate 700 and a bottom plate 702, within which a middle plate 1350 is disposed to define one or more flow paths and/or separate top and bottom portions of the cavity), via an inlet port 1302.

At block 1404, a concurrent initiation of flow of the fluid through a first serpentine flow path (e.g., serpentine flow path 1300) on a first side of the middle plate and a second serpentine flow path (e.g., a second serpentine flow path that mirrors the serpentine flow path 1300 and that includes sub-channels 704 defined by the ridges 1309, the ridges 706, and/or the structural features 1307) on an opposing second side (e.g., opposing second side 712) of the middle plate may be facilitated. For example, facilitating the concurrent initiation of the flow may include allowing the fluid to flow from the first side of the middle plate to the opposing second side of the middle plate through one or more openings (e.g., openings 1308., such as the fifth set 1351 of the openings 1308) in the middle plate that are located at or near an inlet port (e.g., inlet port 1302) of the cold plate.

In one or more implementations, the process 1400 may also include allowing the fluid to flow from the first side of the middle plate to the opposing second side of the middle plate or to from the opposing second side of the middle plate to the first side of the middle plate through one or more additional openings (e.g., the first set 1311, the second set 1313, the third set 1315, the fourth set 1317, and/or one or more other openings 1308 or sets of openings 1308) in the middle plate that are located at a turn or corner in the first serpentine flow path (e.g., and the second serpentine flow path). In one or more implementations, the process 1400 may also include providing thermal control (e.g., cooling) to one or more battery cells (e.g., two groups of battery cells in contact with two opposing sides of the cold plate) via thermal coupling between the cold plate and the one or more battery cells. In one or more implementations, the process 1400 may also include operating an electric vehicle using the one or more battery cells.

Aspects of the subject technology can help improve the efficiency and/or reliability of battery cells, which can help improve the efficiency and/or range of electric vehicles. This can help facilitate the functioning of and/or proliferation of electric vehicles, which can positively impact the climate by reducing greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus, comprising:
    a plate comprising a first serpentine flow path, on a first side of the plate, for a thermal fluid from an inlet port to an outlet port;
    a second serpentine flow path, on an opposing second side of the plate, for the thermal fluid from the inlet port to the outlet port;
    a plurality of structural features that extend across the first serpentine flow path; and
    a plurality of openings in the plate at or near the inlet port that allow the thermal fluid from the inlet port to concurrently initiate flow toward the outlet port through both the first serpentine flow path on the first side of the plate and the second serpentine flow path on the opposing second side of the plate.

2. The apparatus of claim 1, wherein the plurality of structural features increase a burst pressure threshold of a cold plate.

3. The apparatus of claim 1, wherein the plurality of structural features separate a plurality of sub-channels of the first serpentine flow path, and wherein the sub-channels are partially defined by the plurality of structural features and define the first serpentine flow path on the first side of the plate.

4. The apparatus of claim 1, wherein the plurality of structural features are formed from undulations in the plate and each extend from a floor of a corresponding sub-channel to a respective ridge.

5. The apparatus of claim 4, wherein each of the structural features comprises a respective one of the ridges, and wherein each ridge forms an additional sub-channel of the second serpentine flow path on the opposing second side of the plate.

6. The apparatus of claim 1, wherein the plate further comprises a plurality of additional openings that allow the thermal fluid to flow through the plate between the first serpentine flow path on the first side of the plate and the second serpentine flow path on the opposing second side of the plate.

7. The apparatus of claim 6, wherein:
    a first set of the plurality of additional openings are arranged in a first row that extends from a first corner of the plate diagonally away from first and second edges of the plate that define the first corner;
    a second set of the plurality of additional openings are arranged in a second row that extends from a second corner of the plate toward an inner end of the first row and diagonally away from the second edge and a third edge of the plate that define the second corner;
    a third set of the plurality of additional openings are arranged in a third row that extends from a third corner of the plate diagonally away from the third edge and a fourth edge of the plate that define the third corner; and
    a fourth set of the plurality of additional openings are arranged in a fourth row that extends from a location along the fourth edge of the plate toward an inner end of the third row.

8. The apparatus of claim 1, wherein the plate further comprises a plurality of additional openings located at one or more corners in the first serpentine flow path.

9. The apparatus of claim 1, wherein the plate comprises a middle plate of a cold plate that is formed from a top plate, a bottom plate, and the middle plate disposed between the top plate and the bottom plate.

10. The apparatus of claim 9, wherein the cold plate further comprises a flange that extends along an edge of the cold plate outside of the first serpentine flow path, and wherein the flange comprises one or more locating features for attaching the cold plate to one or more cell carriers.

11. The apparatus of claim 10, wherein the flange further comprises one or more datuming features configured to facilitate alignment of a battery module with one or more structures of a battery pack.

12. The apparatus of claim 9, further comprising a plurality of battery cells each disposed within an outer boundary of a thermal contact surface of the cold plate.

13. The apparatus of claim 1, wherein the plate is disposed between two groups of battery cells in an electric vehicle.

14. The apparatus of claim 1, wherein the plurality of structural features include structural features formed in segments, including:
    first segments that extend from the inlet port to a first central portion of the plate, and second segments that extend perpendicularly to the first segments from the first central portion to a second central portion of the plate;

third segments that extend perpendicularly to the first segments and parallel to the first segments from the second central portion to a first edge portion of the plate, and fourth segments that extend perpendicularly to the third segments from the first edge portion to a first corner of the plate; and fifth segments that extend perpendicularly to the fourth segments and parallel to the third segments from the first corner of the plate to a second corner of the plate, sixth segments that extend perpendicularly to the fifth segments from the second corner to a third corner of the plate, and seventh segments that extend perpendicularly to the sixth segments from the third corner of the plate to the outlet port.

15. A thermal component, comprising:
a middle plate that defines:
a first serpentine flow path, on a first side of the middle plate, for a cooling fluid from an inlet port to an outlet port, wherein the middle plate;
a second serpentine flow path, on an opposing second side of the middle plate, for the cooling fluid from the inlet port to the outlet port;
a plurality of structural features that extend across the first serpentine flow path; and
a plurality of openings in the middle plate, the plurality of openings configured to be located at or near an inlet port of the thermal component and to allow the cooling fluid from the inlet port to concurrently initiate flow toward the outlet port through both the first serpentine flow path on the first side of the middle plate and the second serpentine flow path on the opposing second side of the middle plate.

16. The thermal component of claim 15, wherein the plurality of structural features are formed from a plurality of respective undulations in the middle plate.

17. The thermal component of claim 15, wherein each of the plurality of structural features comprises a ridge that defines a portion of the second serpentine flow path on the opposing second side of the middle plate.

18. A method, comprising:
providing a fluid into a cold plate on a first side of a middle plate of the cold plate from an inlet port;
facilitating a concurrent initiation of flow of the fluid through a first serpentine flow path on the first side of the middle plate and a second serpentine flow path on an opposing second side of the middle plate in part by allowing a portion of the fluid to flow from the first side of the middle plate to the opposing second side of the middle plate through a plurality of openings in the middle plate that are located at or near an inlet port of the cold plate; and
providing an outlet of the fluid via an outlet port concurrently from both the first serpentine flow path and the second serpentine flow path, wherein the middle plate comprises a plurality of structural features that extend across the first serpentine flow path, and an additional plurality of openings at or near the outlet port that allow the outlet of at least some of the portion of the fluid via the outlet port from the second serpentine flow path.

19. The method of claim 18, wherein the plurality of structural features that extend across the first serpentine flow path comprise segments that extend from the inlet port to a first central portion of the middle plate.

20. The method of claim 18, further comprising allowing the fluid to flow from the first side of the middle plate to the opposing second side of the middle plate or from the opposing second side of the middle plate to the first side of the middle plate through one or more further additional openings in the middle plate that are located at a turn in the first serpentine flow path.

* * * * *